United States Patent [19]
Ina

[11] Patent Number: 5,486,817
[45] Date of Patent: Jan. 23, 1996

[54] COMMUNICATION SYSTEM FOR VEHICLE CONTROL SYSTEM HAVING PRESETTABLE INITIAL STATE

[75] Inventor: Katsuhiro Ina, Okazaki, Japan

[73] Assignee: Nippondenso Co., Ltd., Kariya, Japan

[21] Appl. No.: 96,838

[22] Filed: Jul. 26, 1993

Related U.S. Application Data

[63] Continuation of Ser. No. 701,169, May 17, 1991, abandoned.

[30] Foreign Application Priority Data

May 21, 1990 [JP] Japan .................................. 2-130526
Apr. 16, 1991 [JP] Japan .................................. 3-084152

[51] Int. Cl.$^6$ .................................................. G05B 23/02
[52] U.S. Cl. ............................. 340/825.16; 340/825.18; 370/85.1; 307/10.1
[58] Field of Search ........................ 340/825.16, 825.18, 340/870.13; 364/424.01, 424.05; 370/85.1, 85.13, 112, 113; 307/9.1, 10.1, 10.8, 272.3, 473; 327/143, 392; 326/32, 33, 56, 58

[56] References Cited

U.S. PATENT DOCUMENTS 4,572,966  2/1986  Hepworth ............................... 307/272.3
4,715,031  12/1987  Crawford et al. ...................... 370/85.1

(List continued on next page.)

FOREIGN PATENT DOCUMENTS 2038033  7/1980  United Kingdom .

OTHER PUBLICATIONS

Mitchell, Ronald L., "A Small Area Network for Cars", MOS Microprocerssor Div. Signetics Corp., 840317, pp. 177–184.
SAE Technical Paper Series, 860389, "Chrysler Collision Detection (C²D)–A Revolutionary Vehicle Network" International Congress and Exposition, Detroit, Mich., Feb. 24–28, 1986, pp. 1–5.
SAE Technical Paper Series, 880586, "Chrysler Collision Detection (C²D™) Bus Interface, Integrated Circuit User Manual", 1986, pp. 1–18.
SAE Technical Paper Series, 850448, "Application of ISO Reference Model to Automotive Multiplexing", Internation Congress & Exposition, Detroit Mich., Feb. 25–Mar. 1, 1985, entire document.
Miyake et al. "Advances in Multiplexing in Automobiles" SP–806, Society of Automotive Engineers, Inc. Feb. 1990 pp. 89–98.
Harris et al., "Multiplexing in Automobiles" SP–773, International Congress and Exposition, Feb. 27–Mar. 1989, pp. 56–65.
Patent Abstracts of Japan, vol. 10, No. 60 (P–435) (2117) 11 Mar. 1986, JP–A–60–204–004 (15 Oct. 1985) Abstract.
Patent Abstracts of Japan, vol. 7, No. 146 (P–206) (1291) 25 Jun. 1983, JP–A–58–058–605 (7 Apr. 1983) Abstract.

*Primary Examiner*—John K. Peng
*Assistant Examiner*—Andrew Hill
*Attorney, Agent, or Firm*—Cushman, Darby & Cushman

[57] ABSTRACT

A communication system for a vehicle conducts mutual communication between a central station and peripheral stations via a communication signal line. A communication signal from the central station is inputted via the communication signal line, which is outputted to an output circuit via a shift register and another register to drive and control lamps and the like. In addition, a continuity control circuit is controlled during a period from a time at which an electric power supply voltage is supplied to the peripheral station from a battery carried on the vehicle until the peripheral station receives a first communication signal from the central station to electrically separate the register and the output circuit. In such a case, the output circuit is connected to the other components to enable drive control in a desired initial state regardless of the above-mentioned communication signal. When the first communication signal from the central station is received, drive control of the above-mentioned control system is carried out in accordance with the communication signal.

8 Claims, 5 Drawing Sheets

U.S. PATENT DOCUMENTS

| | | | |
|---|---|---|---|
| 4,736,116 | 4/1988 | Pavlak, Jr. et al. | 307/41 |
| 4,739,323 | 4/1988 | Miesterfeld et al. | 340/825.50 |
| 4,742,349 | 5/1988 | Miesterfeld et al. | 340/825.50 |
| 4,839,530 | 6/1989 | Greenwood | 307/9.1 |
| 4,845,708 | 7/1989 | Herrmann, Jr. et al. | 307/10.1 |
| 4,855,623 | 8/1989 | Flaherty | 307/473 |
| 4,899,338 | 2/1990 | Wroblewski | 370/85.1 |
| 4,907,222 | 3/1990 | Slavik | 307/10.1 |
| 4,942,571 | 7/1990 | Möller et al. | 370/85.13 |

COMMUNICATION SYSTEM FOR VEHICLE CONTROL SYSTEM HAVING PRESETTABLE INITIAL STATE

This is a continuation of application Ser. No. 07/701,169, filed on May 17, 1991, which was abandoned upon the filing hereof.

BACKGROUND OF THE INVENTION

1. Field of the Invention

The present invention relates to a communication system for a vehicle in which a plurality of control units (hereinafter referred to as ECUs) are connected to a communication signal line to perform control operations.

2. Description of the Prior Art

In a multiplex communication system for a vehicle, processing units (hereinafter referred to as CPUs) each having the same communication processing capacity are carried on each of the vehicles ECUs (such as the ECU of the door lock system for controlling the vehicle's door locks, the ECU of the engine system for controlling the vehicle's engine, etc.); thereby, communication between the ECU is realized.

However, in the above-mentioned system, there is an ECU which performs only input of a signal or control of an actuator, an ECU which also performs control of other control systems and the like, and the communication processing capacity required by each ECU differs depending on the type of control system, whereas CPUs each having the same communication processing capacity are carried on the ECUs so that efficient use of the CPUs' processing power is extremely bad.

3. Prior Work

The present inventor has developed a communication system for a vehicle as shown in FIG. 3. In FIG. 3, ECU 0 through ECU 5 are connected together using a communication signal line to establish mutual communication therebetween, and only the ECU 3 implements an arithmetic operation or communication processing function using a microprocessor or other such CPU as a central ECU, while other units such as ECU 0 to ECU 2, ECU 4 and ECU 5 are peripherals which implement a communication function and input and output signals without a need to implement the arithmetic operation function.

These peripheral ECUs are arranged at various places in the vehicle in order to perform control of door locks, the vehicle's engine, blinkers, lamps and the like. The peripheral ECUs monitor switch signals, detection signals and the like in their respective areas and provide signals to the communication signal line, control lamps, actuators and the like on the basis of data received from the communication signal line. A peripheral ECU circuit is shown in FIG. 2.

In FIG. 2, a communication IC 10 is driven by an oscillation element 11 via an XTAL 0 terminal and an XTAL 1 terminal. The communication IC 10 detects states of external switches SW 0 to SW 7 at signal input terminals IN 0 to IN 7 via an input circuit 15. States of the terminals IN 0 to IN 7 are outputted to the communication on signal line via a driver 12 from a TX terminal. Additionally, communication data inputted to an RX terminal of the communication IC 10 via a receiver 13 from the communication signal line is outputted front signal output terminals OUT 0 to OUT 7 of the communication IC 10.

The communication signal line is connected to a plurality of peripheral ECUs, (i.e., to ECU 0 to ECU 2, ECU 4, and ECU 5 as shown in FIG. 3) and also to the central ECU 3 in FIG. 3 implementing the arithmetic operation processing function, wherein signals inputted to each of the peripheral ECUs are received by ECU 3 via the communication signal line, and any necessary arithmetic operation processing functions are performed in the ECU 3 in accordance with the inputted information. The result of the processing performed by the ECU 3 is transmitted to the peripheral ECUs via the communication signal line, and the lamps or actuators connected thereto are controlled by the outputs of the peripheral ECU responsive to the processing results.

In order to make the peripheral ECUs which implement only inputting, outputting and communication functions low cost and compact, simple circuits must be used for the inputting circuit 15 and the outputting circuit 16. However, in the circuit shown in FIG. 2, when the ignition switch IG is turned ON to apply operative power to the system until relevant communication data is received from ECU 3 via the communication signal line, the initial states of the output terminals OUT 0 to OUT 7 cannot be established based solely on the internal information in each peripheral ECU. This means that any desired control cannot be performed in the initial state until the data is provided by the ECU 3. For example, in FIG. 2, if it is required that the lamps L0 to L2 are OFF and the lamp L3 is ON when the ignition switch IG is ON, if the output terminals OUT 0 to OUT 7 are high in their initial state, the lamps L0 and L1 are lit and L2 and L3 are turned off. On the other hand, if the output terminals OUT 0 to OUT 7 are low in their initial state, the lamps L0 and L1 are turned off and lamps L2 and L3 are lit. In other words, it is impossible to turn the lamps L0 to L2 off and turn only the lamp L3 on by setting the initial state of the output terminals OUT 0 to OUT 7. In such a case, it may be possible to add NOT circuits between the output transistors which drive the lamps and the output terminals of the communication IC 10. However, the internal state of the peripheral ECU is still not definite, so the circuits must be complicated to achieve the proper initial state of lamps L0 to L3.

SUMMARY OF THE INVENTION

Thus, an object of the present invention is to establish a desired initial state without requiring individual complicated circuits in a receiving unit for controlling drive items.

In order to achieve the above-mentioned object, the receiving unit is connected to a sending unit via a communication line, and the system comprises:

a communication unit receiving a communication signal sent from the sending unit via the communication line, an outputting device performing drive control of a plurality of driven devices on the basis of the communication signal received by the communication device, and a continuity control device, provided between the communication device and the outputting device separating the electric connection between the communication device and the outputting device during a period from a state in which supply of electric power from a battery mounted on the vehicle to the receiving unit is started until the communication device receives the communication signal from the sending unit, and said outputting device performs drive control of the plurality of driven devices in a desired initial state irrelevant to the communication signal when connection between the communication device and the outputting means is electrically separated by the continuity control device.

DETAILED DESCRIPTION OF THE PREFERRED EMBODIMENTS

Figure 1:
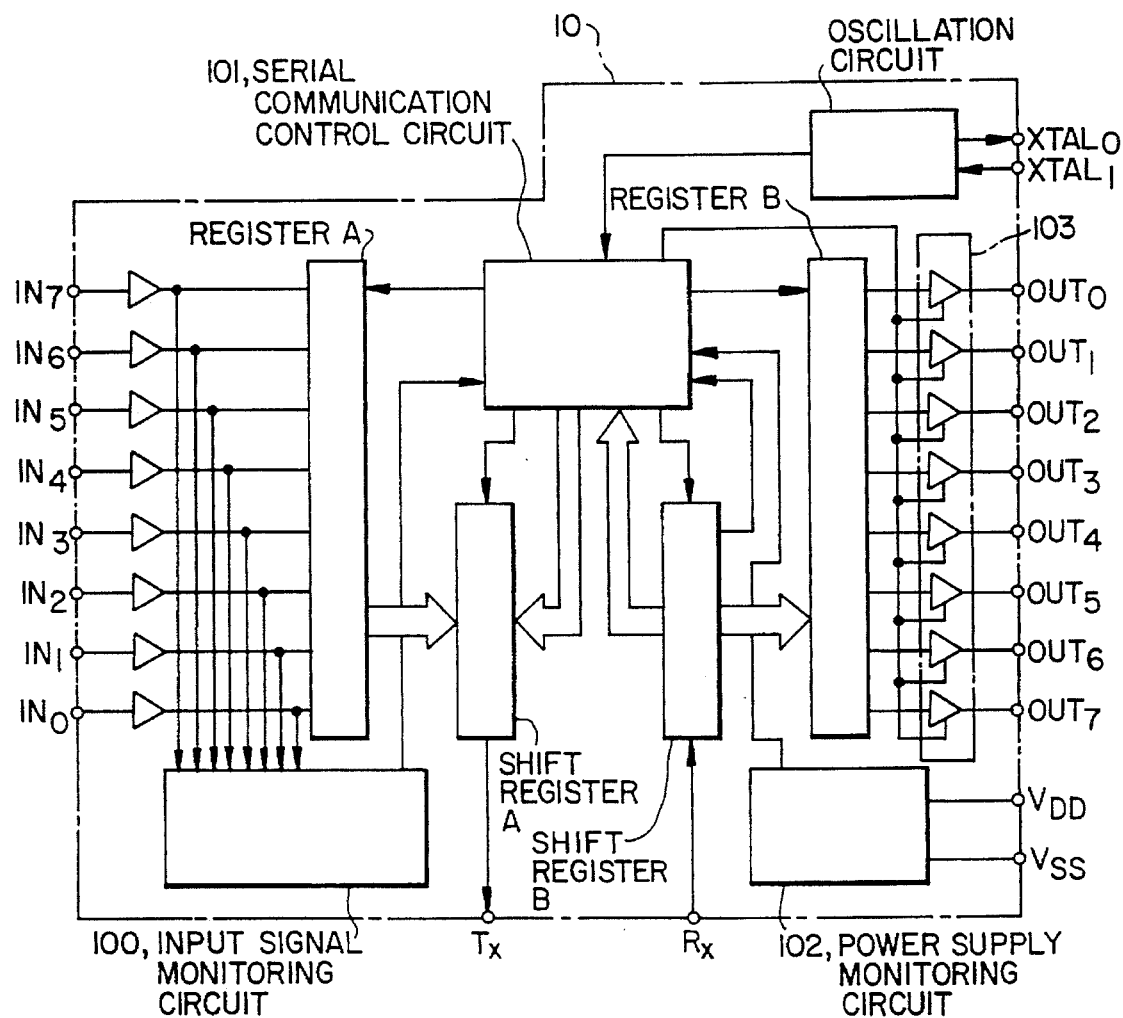
FIG. 1 is a block diagram of a communication IC in an embodiment according to the present invention.

The present invention will be explained hereinafter on the basis of the embodiment shown in the drawings.

According to the embodiment, the communication IC 10 of each peripheral ECU (see FIG. 2) is constructed in a manner as shown in FIG. 1, and output terminals OUT 0 to OUT 7 of the communication IC 10 are held in a high impedance state until data which should be outputted from a communication signal line is received. This allows a state during the period between the time when power is applied and the above-mentioned data is received to be controlled with ease.

Figure 2:
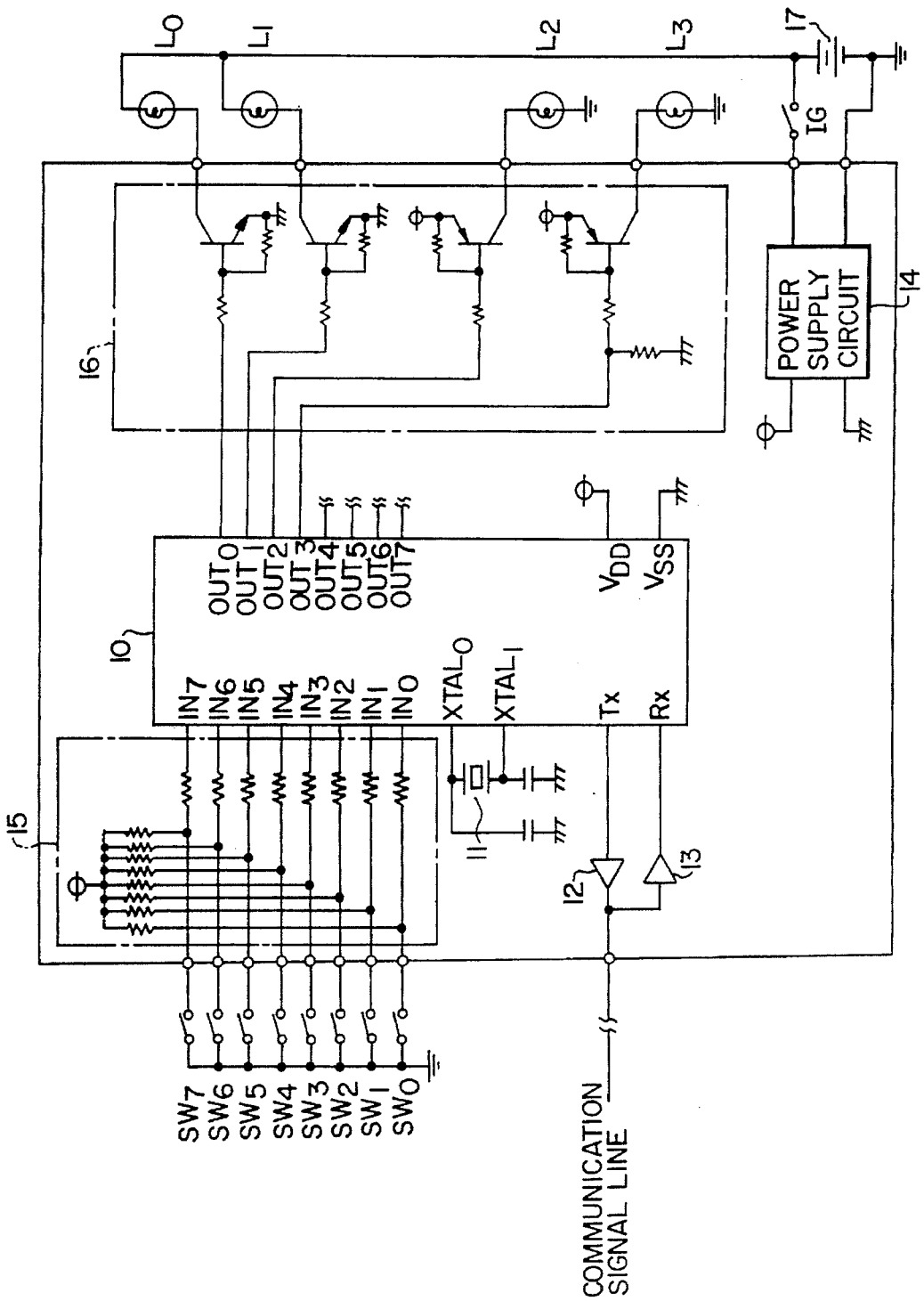
FIG. 2 is a block diagram of a peripheral ECU in the embodiment.

Operation of the communication IC 10 shown in FIG. 1 will be explained hereinafter in conjunction with the operation of the communication system shown in FIG. 3. As shown in FIG. 2, signal input terminals IN 0 to IN 7 of the communication IC 10 are connected to switches SW 0 to SW 7 via an input circuit 15. The states of the signal input terminals IN 0 to IN 7 are monitored by an input signal monitoring circuit 100 (shown in FIG. 1), and when there is a change in those states, a sending start signal to be relayed to the communication signal line is transmitted to a serial communication control circuit 101. The serial communication control circuit 101 transfers data from a register A to a shift register A. A header portion to distinguish the data from data from other ECUs and a communication error detecting code portion FCS such as a CRC code which make it possible to detect an error in the data are added to the data. The composite data is output from a TX terminal as an information signal according to the format shown in FIG. 5A. This TX terminal is connected with the communication signal line via driver 12 shown in FIG. 2, and data at the input terminals IN 0 to IN 7 is transmitted to the ECU 3 show in FIG. 3 as an information signal via the communication signal line.

Figure 5A:
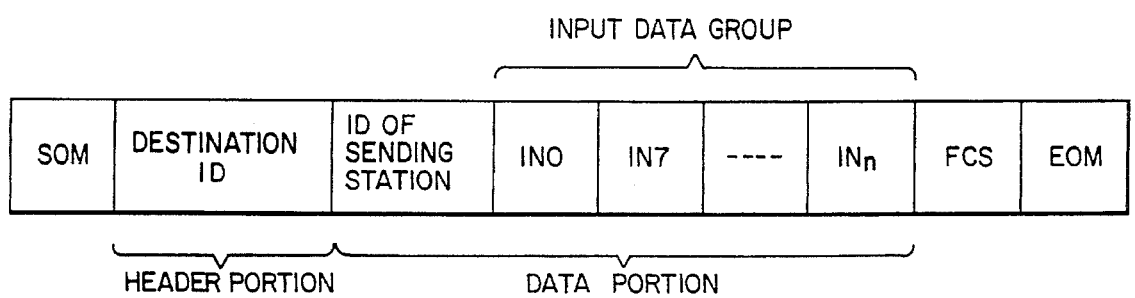
FIG. 5(A) shows a format example of an information signal according to the present invention.

In FIG. 5A, the SOM (Start of Message) and EOM (End of Message) fields respectively indicate the start and the end of a message signal in the frame. In addition, a message header portion is constructed with an ID indicating a destination (CPU of ECU 3), which has been already established in the communication IC 10. In addition, a data portion is constructed with an ID indicating the source unit and an input data group comprising input signals received at the signal input terminals IN 0 to IN 7. As noted above, the FCS (Frame Check Sequence) field is a communication error detecting portion which is implemented as a CRC code in the present embodiment.

Figure 4:
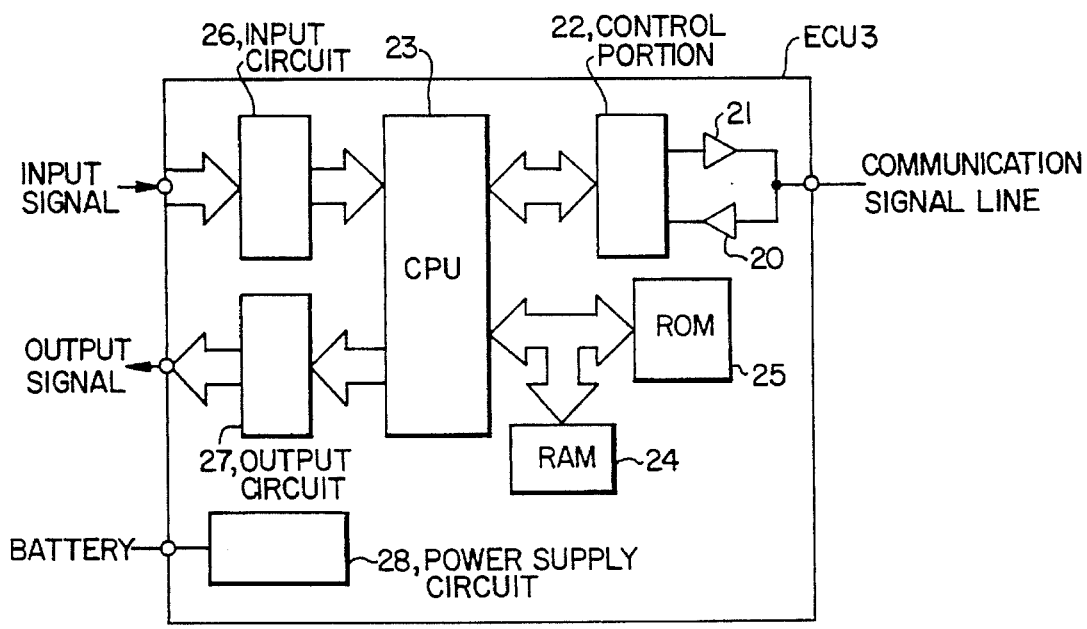
FIG. 4 is a block diagram of a central ECU in the embodiment.

As shown in FIG. 4, the information signal transmitted to the ECU 3 is presented to a communication control portion 22 in the ECU 3 via a receiver 20. The communication control portion 22 wherein the information signal was destined for the ECU 3 based on the destination ID of the header portion of the signal, and when it is so determined, the communication error detecting code FCS is further checked to verify that there is no communication abnormality. In the CPU 23, processing is performed according to, for example, the flowchart shown in FIG. 6. Step 201 of that flowchart determines whether the data portion of the information signal from the peripheral ECU has been inputted to the CPU 23. If so, step 202 stores the input data in a RAM 24. Therefore, data from the peripheral ECUs are collected and stored in RAM 24. On the basis of the stored data, in step 203, any predetermined arithmetic operations necessary for the control performed in each ECU, such as decision-making, arithmetic operations and the like, are performed. In step 204, control data for control is determined after performing appropriate data conversion. The converted data is outputted to the communication control portion 22 in step 205 and is further transmitted to the communication signal line via the driver 21 as a control signal constructed with the format shown in FIG. 5B.

Figure 5B:
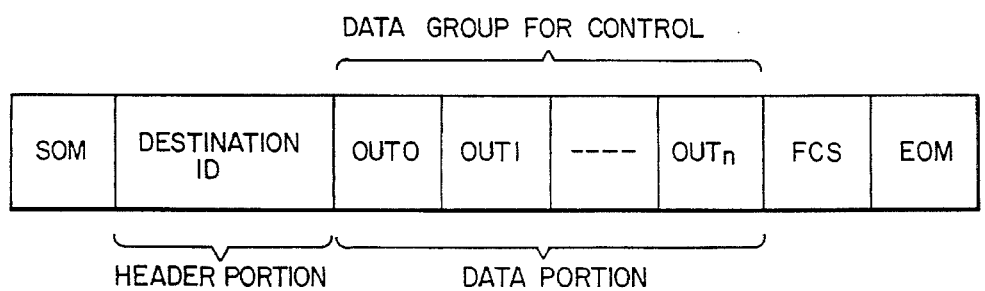
FIG. 5(B) shows a format example of a control signal according to the present invention.
Figure 6:
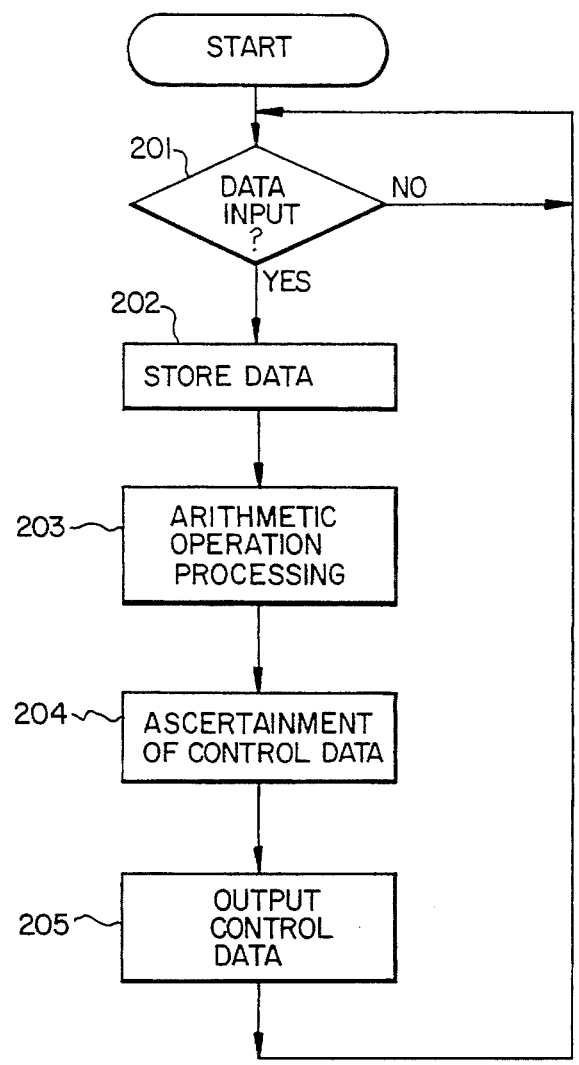
FIG. 6 is a flowchart showing a processing procedure of the CPU according to the present invention.

The control signal shown in FIG. 5B has its data portion arranged in format suitable for control, such as, for example, data for control assigned to each output terminal. This is done to drive a control system (such as lamps L0 to L3) connected to output terminals OUT 0 to OUT 7 in the peripheral ECU Z shown in FIG. 2. In the communication control portion 22, the ID indicating the destination (the header portion), the communication error detecting code FCS, the SOM, and the EOM are added to the data group to be transmitted from the driver 21 to the communication signal line. This control signal is inputted to an RX terminal of the communication IC 10 shown in FIG. 1 via the receiver 13 shown in FIG. 2.

Figure 7:
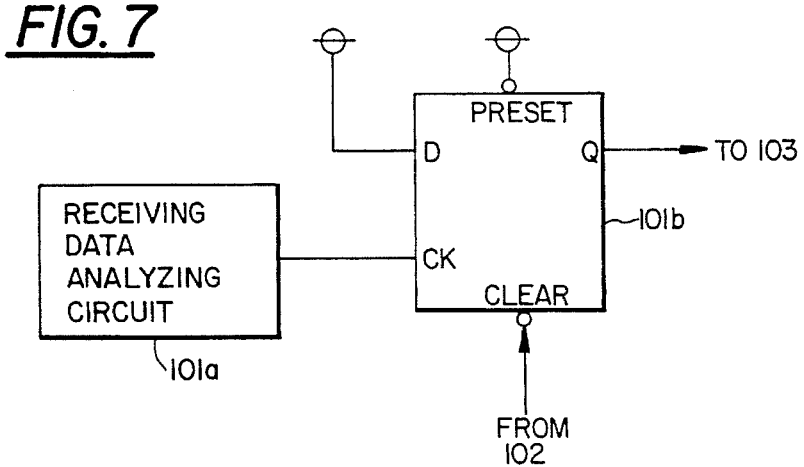
FIG. 7 is a diagram showing a part of a serial communication control circuit.

When the communication data (the control signal) received from the RX terminal is inputted to a shift register B, it is transmitted to a serial communication control circuit 101. As shown in FIG. 7, the serial communication control circuit 101 contains a receiving data analyzing circuit 101a. This receiving data analyzing circuit 101a checks the header portion of the received data to verify that it is communication data destined for that unit. If so, the communication error detecting code expressed by the CRC code is checked to detect the presence of a communication abnormality. When this received data analyzing circuit 101a has determined that the data is data destined for that unit and there is no abnormality, then according to the result, the serial communication control circuit 101 transfers the data in the shift register B to a register B to output the received data from the output terminals OUT 0 to OUT 7. At this time, the data for control at each of the output terminals OUT 0 to OUT 7 represents corresponding parts of the data portion of the control signal shown in FIG. 5B.

On the basis of the control data, output transistors in an output circuit 16 are drive to control items such as lamps, actuators and the like are controlled.

In addition, as shown in FIG. 1, an electric power supply monitoring circuit 102 detects whether electric power is supplied from an electric power supply circuit 14 (FIG. 2)

which is connected to a battery 17 via an ignition switch IG, or whether the voltage has been decreased to a level which makes it impossible to maintain the data stored in the register B. This electric power supply monitoring circuit 102 outputs a low-level signal when the voltage is lower than a predetermined level, and it outputs a high-level signal when the voltage is higher than a predetermined level. With respect to signal generation thereof, the system includes a delay circuit for providing a delay of a certain period. An output from this electric power supply monitoring circuit 102 is applied to a CLEAR terminal of a D-type flip flop 101b contained in the serial communication control circuit 101. In addition, the above-mentioned receiving data analyzing circuit 101a toggles the flip flop 101b when it detects a normal input of the above mentioned receiving data. Therefore, when the electric power supply voltage decreases, the flip flop 101b is reset, so that its output Q is low, and a continuity control circuit 103 is turned off. In addition, immediately after the IG switch comes ON to allow the electric power supply to become a normal voltage from a low voltage, the output Q of the flip flop 101b is maintained at the low level, and the continuity control circuit 103 is turned off. In this manner, when the continuity control circuit 103 is turned off, the continuity control circuit 103 inhibits the contents of the register B from being outputted to the output terminals OUT 0 to OUT 7, so that the output terminals OUT 0 to OUT 7 are in a high impedance state. At this time, the status of output terminals OUT 0 to OUT 7 depends on the external output circuit 16 of the communication IC 10 (FIG. 2) to attain a predetermined state. For example, in FIG. 2 as described above, when the ignition switch IG is turned on, the lamps L0 to L2 are OFF, and the lamp L3 is ON, then the output terminals OUT 0 to OUT 7 of the communication IC 10 are in a high impedance state so that the output circuit 16 is electrically separated from the communication IC 10 and a base potential of each output transistor of the output circuit 16 is held at the GND level or at the electric power supply voltage level as shown in FIG. 2.

After the ignition switch IG is turned on, when the first normal data is received at the RX terminal, the serial communication control circuit 101 transfers the contents of the shift resistor B to the register B as described above. In addition, when normal data is received, the receiving data analyzing circuit 101 a generates a clock signal, so that the state of the D-type flip-flop is outputted to make the output Q assume a high state. Therefore, the continuity control circuit 103 is turned on, and the outputs of the output terminals OUT 0 to OUT 7 are provided to control the lamps, actuators and the like according to the received data.

As described above, a low-cost, compact communication system capable of performing required actuation operations can be realized, and peripheral ECUs can be provided, for example, in narrow places (e.g., a door or the like) in which installation has been impossible due to numerous obstructions, and space savings can be also accomplished. Although in the above mentioned example, a peripheral ECU having both inputting and outputting functions has been shown, peripheral ECUs which exclusively perform input functions or which exclusively perform output functions may be included.

Figure 3:
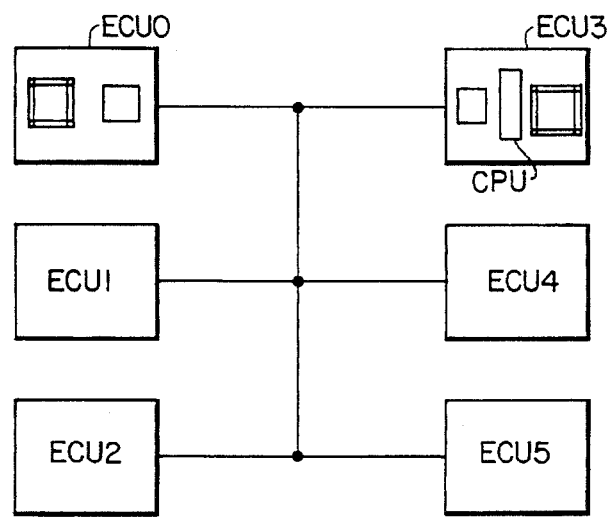
FIG. 3 is a block diagram of a communication system for a vehicle in which the embodiment of the present invention is applied.

Moreover, for example in FIG. 3, according to an information signal inputted by an ECU 0 (for exclusively performing input), arithmetic operation processing is performed in an ECU 3 (a central station) on the basis of the information signal, and a control signal may be sent on the basis of the processing result as an exclusive output for an ECU 5.

What is claimed is:

1. A communications system for a vehicle, comprising a sending station and a receiving station which are actuated by receiving an electric power supply from a battery mounted on the vehicle, said sending station and said receiving station being positioned at various places in the vehicle, wherein communication between the sending station and the receiving station is performed via a communication line, said receiving station comprising:

communication means for receiving a communication signal sent from said sending station via said communication line, outputting means for performing drive control of a plurality of driven means in accordance with said communication signal when the communication signal is received by said communication means, and continuity control means, provided between said communication means and said outputting means, to electrically connect and disconnect therebetween, for electrically separating said communication means from said outputting means to electrically disconnect therebetween by assuming a high impedance state between a time when supply of electric power supply voltage from said battery to the receiving station is started, until said communication means receives the communication signal from said sending station, wherein said outputting means performs drive control of said plurality of driven means in a desired initial state independent of said communication signal when connection between said communication means and outputting means is electrically separated by means of said continuity control means.

2. The communication system for a vehicle according to claim 1, further comprising:

electric power supply voltage detecting means for detecting said electric power supply voltage of said battery;

wherein said continuity control means comprises means for electrically separating said communication means from said outputting means between a time when said voltage detected by said electric power supply voltage detecting means has risen from a low voltage state, which is lower than a first predetermined voltage, to a second predetermined voltage, and until said communication means receives the communication signal from said sending station.

3. The communication system for a vehicle according to claim 2, wherein said continuity control means electrically separates said communication means from said outputting means also during a period in which said voltage detected by said electric power supply voltage detecting means is in said low voltage state.

4. The communication system for a vehicle according to claim 1, wherein:

said continuity control means comprises reception detecting means for detecting reception of a first communication signal from said sending station and for establishing an electrical connection between said communication means and said outputting means.

5. A communication system for a vehicle, comprising a first station and a second station which are actuated by receiving electric power supply from a battery mounted on the vehicle, said first and second stations being positioned at various places in the vehicle, wherein the first station and the second station communicate via a communication signal line, said first station comprising:

first communication means, receiving an input signal, for sending an information signal including said input signal via said communication signal line, and for receiving a communication signal sent from said second station via said communication signal line, outputting means for performing drive control of a plurality of driven means in accordance with said communication signal when the communication signal is received by said first communication means, and continuity control means, provided between said first communication means and said outputting means to electrically connect and disconnect therebetween, for electrically separating said first communication means from said outputting means to electrically disconnect therebetween by assuming a high impedance state between a time when supply of an electric power supply voltage from said battery to the first station is started, until said first communication means receives the communication signal from said second station, and wherein said outputting means performs drive control of said plurality of driven means in a desired initial state independent of said communication signal when connection between said first communication means and said outputting means is electrically separated by said continuity control means, and said second station comprising:

second communication means for receiving said information signal from said first station via said communication signal line and for sending a control signal to said first station as said communication signal via said communication signal line, and arithmetic operation processing means, connected with the second communication means, for performing an arithmetic operation processing on the basis of said information signal received by said second communication means and for making said control signal on the basis of a result of said arithmetic operation processing.

6. The communication system for a vehicle according to claim 5, further comprising:

electric power supply voltage detecting means for detecting said electric power supply voltage supplied to said first station from said battery;

wherein said continuity control means comprises means for electrically separating said first communication means from said outputting means during a period, said period beginning at a state in which said voltage detected by said electric power supply voltage detecting means has risen from a low voltage state, which is less than a first predetermined voltage, to a second predetermined voltage and said period ending at a state when said first communication means receives the communication signal from said second station.

7. The communication system for a vehicle according to claim 6, wherein said continuity control means electrically separates said first communication means from said outputting means also during a period in which said voltage detected by said electric power supply voltage detecting means is in said low voltage state.

8. The communication system for a vehicle according to claim 5, wherein:

said continuity control means comprises reception detecting means for detecting a reception of a first communication signal from said second station and to establish an electrical connection between said first communication means and said outputting means.

* * * * *